United States Patent
Yamaki et al.

(10) Patent No.: US 11,028,257 B2
(45) Date of Patent: Jun. 8, 2021

(54) FLAME-RETARDANT RESIN COMPOSITION, AND INSULATING WIRE, METAL CABLE, OPTICAL FIBER CABLE AND MOLDED ARTICLE USING THE SAME

(71) Applicant: FUJIKURA LTD., Tokyo (JP)

(72) Inventors: Yusuke Yamaki, Chiba (JP); Shoichiro Nakamura, Chiba (JP)

(73) Assignee: Fujikura Ltd., Tokyo (JP)

( * ) Notice: Subject to any disclaimer, the term of this patent is extended or adjusted under 35 U.S.C. 154(b) by 248 days.

(21) Appl. No.: 16/462,478

(22) PCT Filed: Oct. 3, 2017

(86) PCT No.: PCT/JP2017/035913
§ 371 (c)(1),
(2) Date: May 20, 2019

(87) PCT Pub. No.: WO2018/096794
PCT Pub. Date: May 31, 2018

(65) Prior Publication Data
US 2020/0062937 A1 Feb. 27, 2020

(30) Foreign Application Priority Data

Nov. 22, 2016 (JP) .............................. JP2016-227301

(51) Int. Cl.
| | | |
|---|---|---|
| *C08L 23/06* | (2006.01) | |
| *C08L 23/36* | (2006.01) | |
| *C08K 5/00* | (2006.01) | |
| *C08K 5/09* | (2006.01) | |
| *C08K 5/17* | (2006.01) | |
| *C08K 5/3432* | (2006.01) | |
| *C08K 5/3492* | (2006.01) | |
| *C08K 5/5419* | (2006.01) | |
| *C08K 3/26* | (2006.01) | |

(52) U.S. Cl.
CPC ............... *C08L 23/06* (2013.01); *C08L 23/36* (2013.01); *C08K 5/0066* (2013.01); *C08K 5/09* (2013.01); *C08K 5/17* (2013.01); *C08K 5/3432* (2013.01); *C08K 5/3492* (2013.01); *C08K 5/5419* (2013.01); *C08K 2003/265* (2013.01); *C08L 2201/02* (2013.01); *C08L 2203/206* (2013.01); *C08L 2205/02* (2013.01); *C08L 2207/062* (2013.01); *C08L 2207/064* (2013.01); *C08L 2207/066* (2013.01)

(58) Field of Classification Search
None
See application file for complete search history.

(56) References Cited

U.S. PATENT DOCUMENTS 6,429,246 B1 8/2002 Rous

FOREIGN PATENT DOCUMENTS

| CA | 2434805 A1 | 7/2002 |
|---|---|---|
| EP | 2184319 A1 | 5/2010 |
| EP | 3147322 A1 | 3/2017 |
| EP | 3187534 A1 | 7/2017 |
| JP | H04-296342 A | 10/1992 |
| JP | H04298551 A | 10/1992 |
| JP | H10007913 A | 1/1998 |
| JP | 2001184946 A | 7/2001 |
| JP | 2003238747 A | 8/2003 |
| JP | 2005187595 A | 7/2005 |
| JP | 201494969 A | 5/2014 |
| JP | 2015221865 A | 12/2015 |
| TW | 201623591 A | 7/2016 |
| WO | 2015/178151 A1 | 11/2015 |
| WO | 2016031789 A1 | 3/2016 |

OTHER PUBLICATIONS

International Search Report issued in corresponding application No. PCT/JP2017/035913 dated Dec. 12, 2017 (4 pages).
Written Opinion of the International Searching Authority issued in corresponding application No. PCT/JP2017/035913 dated Dec. 12, 2017 (4 pages).
Office Action issued in corresponding Chinese Patent Application No. CN 201780050478.7 dated Nov. 30, 2020 (8 pages).

*Primary Examiner* — Robert T Butcher
(74) *Attorney, Agent, or Firm* — Osha Bergman Watanabe & Burton LLP

(57) ABSTRACT

A flame-retardant resin composition may include a base resin composed of polyethylene and an acid-modified polyolefin, a silicone compound, a fatty acid-containing compound, and a hindered amine-based compound that includes a hindered amine structure. The polyethylene may include a high-density polyethylene, a medium-density polyethylene and a low-density polyethylene, where the high-density polyethylene has a density of 945 kg/m$^3$ or more, the medium-density polyethylene has a density of 914 kg/m$^3$ or more and less than 945 kg/m$^3$, and the low-density polyethylene has a density of 864 kg/m$^3$ or more and less than 914 kg/m$^3$. The base resin may contain the high-density polyethylene in an amount of 40 mass % or more and 60 mass % or less, the medium-density polyethylene in an amount of 1 mass % or more and 35 mass % or less, and the low-density polyethylene in an amount of 10 mass % or more and 30 mass % or less.

14 Claims, 3 Drawing Sheets

FLAME-RETARDANT RESIN COMPOSITION, AND INSULATING WIRE, METAL CABLE, OPTICAL FIBER CABLE AND MOLDED ARTICLE USING THE SAME

TECHNICAL FIELD

One or more embodiments of the present invention relate to a flame-retardant resin composition, and an insulating wire, a metal cable, an optical fiber cable, and a molded article using the same.

BACKGROUND

A polyvinyl chloride resin (hereinafter referred to as "PVC")) composition has excellent properties in flame retardancy, oil resistance, water resistance, insulation and the like. Further, the PVC composition can be adapted to various intended uses by appropriately adjusting the plasticizer or fillers. Therefore, the PVC composition is widely used for covering insulating wires, tubes, tapes, packaging materials, building materials and the like.

However, PVC compositions may cause the generation of a toxic and harmful chlorine gas at the time of combustion or cause the generation of dioxins, depending on the combustion conditions, since it contains a halogen in its structure. Therefore, a PVC alternative using more environment-friendly eco-materials is needed.

A polyolefin resin may be such an eco-material, and as a flame-retardant resin composition using such a polyolefin resin, it is known that calcium carbonate may be added as a flame retardant and a silicone compound and a fatty acid-containing compound may be added as flame retardant aids(see patent document 1 below), for example.

CITATION LIST

Patent document 1: JPA2014-94969

Further, flame-retardancy as well as excellent mechanical properties and weather resistance are required for flame-retardant resin compositions so that they can be applied to various applications, including cables.

However, the flame-retardant resin composition described in the above-mentioned patent document 1 does not simultaneously satisfy excellent flame retardancy, mechanical properties and weather resistance while it has excellent flame retardancy.

For this reason, a flame-retardant resin composition which can simultaneously satisfy flame retardancy, mechanical properties and weather resistance is required.

SUMMARY

One or more embodiments of the present invention may provide a flame-retardant resin composition which can simultaneously satisfy excellent flame retardancy, mechanical properties and weather resistance, and an insulating wire, a metal cable, an optical fiber cable, and a molded article using the same.

The present inventors have found that the above properties may be provided by blending a silicone compound, a fatty acid-containing compound and a hindered amine-based compound at a predetermined ratio to a base resin composed of polyethylene and an acid-modified polyolefin, using polyethylene composed of high-density polyethylene, medium-density polyethylene and low-density polyethylene, setting each of the contents of the high-density polyethylene, the medium-density polyethylene, the low-density polyethylene and the acid-modified polyolefin to a predetermined ratio and using the hindered amine-based compound composed of two kinds of hindered amine-based compounds.

That is, one or more embodiments of the present invention is a flame-retardant resin composition including a base resin composed of polyethylene and an acid-modified polyolefin, a silicone compound, a fatty acid-containing compound and a hindered amine-based compound including a hindered amine structure, in which the polyethylene is composed of high-density polyethylene, medium-density polyethylene and low-density polyethylene, in which the high-density polyethylene has a density of 945 kg/m$^3$ or more, the medium-density polyethylene has a density of 914 kg/m$^3$ or more and less than 945 kg/m$^3$, the low-density polyethylene has a density of 864 kg/m$^3$ or more and less than 914 kg/m$^3$, in which the content of the high-density polyethylene in the base resin is 40 mass % or more and 60 mass % or less, the content of the medium-density polyethylene in the base resin is 1 mass % or more and 35 mass % or less, the content of the low-density polyethylene in the base resin is 10 mass % or more and 30 mass % or less, and the content of the acid-modified polyolefin in the base resin is 1 mass % or more and 20 mass % or less, in which the silicone compound is blended at a ratio of 3 parts by mass or more and 10 parts by mass or less relative to 100 parts by mass of the base resin, the fatty acid-containing compound is blended at a ratio of 3 parts by mass or more and 10 parts by mass or less relative to 100 parts by mass of the base resin, the hindered amine-based compound is blended at a ratio of 0.2 part by mass or more and 2.4 parts by mass or less relative to 100 parts by mass of the base resin, and in which the hindered amine-based compound is composed of a first hindered amine-based compound and a second hindered amine-based compound different from the first hindered amine-based compound.

According to the flame-retardant resin composition of one or more embodiments of the present invention, excellent flame retardancy, mechanical properties and weather resistance can be simultaneously satisfied.

In addition, the present inventors surmise the reason why the above effect is obtained in the flame-retardant resin composition of one or more embodiments of the present invention as follows.

That is, when the silicone compound and the fatty acid-containing compound are contained in the flame-retardant resin composition of one or more embodiments, a barrier layer mainly composed of the silicone compound, the fatty acid-containing compound and a decomposition product thereof is formed on a surface of the base resin at the time of combustion of the flame-retardant resin composition, and combustion of the base resin is suppressed by the barrier layer. Therefore, according to the flame-retardant resin composition of one or more embodiments of the present invention, it is considered that excellent flame retardancy can be secured. Further, it is considered that excellent mechanical properties can be secured by including high-density polyethylene and medium-density polyethylene which have high crystallinity in the base resin. Further, the low-density polyethylene has lower possibility of generating radicals in the main chain by light than high-density polyethylene and medium-density polyethylene. For this reason, deterioration of physical properties caused by cleavage of the main chain by light is less likely to occur. Therefore, it is considered that excellent weather resistance can be secured by including low-density polyethylene in the base resin. Further, more excellent flame retardancy can be obtained by including the acid-modified polyolefin in the base resin. It is considered that this is because the dispersibility of the silicone compound and the fatty acid-containing compound as flame retardant aids is improved.

In the flame-retardant resin composition of one or more embodiments, it is preferable that in the first hindered amine-based compound, a nitrogen atom of the hindered amine structure be bonded to an oxygen atom, and in the second hindered amine-based compound, a nitrogen atom of the hindered amine structure be bonded to a hydrogen atom or a carbon atom.

In one or more embodiments, more excellent flame retardancy can be obtained in the first hindered amine-based compound, and excellent weather resistance can be obtained in the second hindered amine-based compound. Accordingly, excellent flame retardancy and weather resistance can be obtained in the flame-retardant resin composition.

In the flame-retardant resin composition of one or more embodiments, the first hindered amine-based compound preferably includes a group represented by the following formula (1A):

[Chem.1]

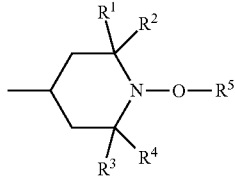

(1A)

(In the formula (1A), $R^1$ to $R^4$ each independently represent an alkyl group having 1 to 8 carbon atoms; $R^5$ represents an alkyl group having 1 to 18 carbon atoms, a cycloalkyl group having 5 to 12 carbon atoms, an aralkyl group having 7 to 25 carbon atoms or an aryl group having 6 to 12 carbon atoms).

In this case, more excellent flame retardancy can be obtained in the flame-retardant resin composition.

In the flame-retardant resin composition of one or more embodiments, the first hindered amine-based compound is preferably represented by the following formula (2A):

[Chem.2]

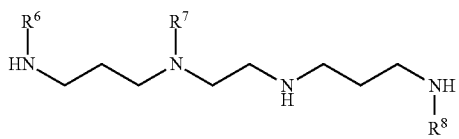

(2A)

(In the formula (2A), $R^6$ to $R^8$ each independently represent a group represented by the following formula (3A):

[Chem.3]

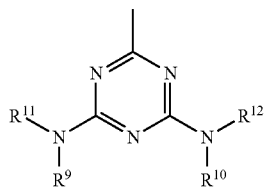

(3A)

(In the formula (3A), $R^9$ and $R^{10}$ each independently represent a group represented by the formula (1A); $R^{11}$ and $R^{12}$ each independently represent an alkyl group having 1 to 18 carbon atoms).

In this case, more excellent flame retardancy can be obtained in the flame-retardant resin composition.

In the flame-retardant resin composition of one or more embodiments, the second hindered amine-based compound preferably includes a repeating unit represented by the following formula (4A):

[Chem. 4]

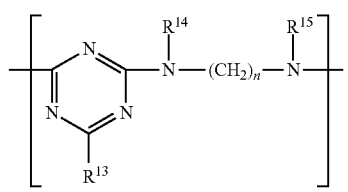

(4A)

(In the formula (4A), $R^{13}$ represents a group containing a nitrogen atom; $R^{14}$ and $R^{15}$ each independently represent a group represented by the following formula (5A); n represents an integer of 1 to 8),

[Chem.5]

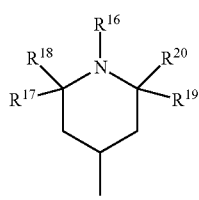

(5A)

(In the formula (5A), $R^{16}$ represents a hydrogen atom, an alkyl group having 1 to 18 carbon atoms, a cycloalkyl group having 5 to 12 carbon atoms, an aralkyl group having 7 to 25 carbon atoms, or an aryl group having 6 to 12 carbon atoms; $R^{17}$ to $R^{20}$ each independently represent an alkyl group having 1 to 8 carbon atoms).

In this case, more excellent weather resistance can be obtained in the flame-retardant resin composition.

In the flame-retardant resin composition of one or more embodiments, it is preferable that the first hindered amine-based compound be blended at a ratio of 0.1 part by mass or more and 1.2 parts by mass or less relative to 100 parts by mass of the base resin and the second hindered amine-based compound be blended at a ratio of 0.1 part by mass or more and 1.2 parts by mass or less relative to 100 parts by mass of the base resin.

In this case, more excellent flame retardancy and weather resistance can be obtained in the flame-retardant resin composition.

It is preferable that the flame-retardant resin composition preferably further include calcium carbonate, and the calcium carbonate be blended at a ratio of more than 0 part by mass and 60 parts by mass or less relative to 100 parts by mass of the base resin.

In this case, more excellent flame retardancy can be obtained in the flame-retardant resin composition compared to a case where calcium carbonate is not blended. Further, compared to a case where calcium carbonate is blended at a ratio of more than 60 parts by mass relative to 100 parts by mass of the base resin, more excellent mechanical properties can be obtained in the flame-retardant resin composition.

In the flame-retardant resin composition of one or more embodiments, the acid-modified polyolefin is preferably a maleic anhydride-modified polyolefin.

In this case, compared to a case where the acid-modified polyolefin is an acid-modified polyolefin other than maleic anhydride-modified polyolefin, the flame-retardant resin composition has more excellent mechanical properties.

In the flame-retardant resin composition of one or more embodiments, the silicone compound is preferably silicone gum.

In this case, compared to a case where the silicone compound is a silicone compound other than silicone gum, blooming is less likely to occur in the flame-retardant resin composition.

In the flame-retardant resin composition of one or more embodiments, the fatty acid-containing compound is preferably magnesium stearate.

In this case, compared to a case where the aliphatic-containing compound is a fatty acid-containing compound other than magnesium stearate, more excellent flame retardancy can be obtained with a small amount of addition in the flame-retardant resin composition.

Further, one or more embodiments of the present invention is an insulating wire including a metal conductor and an insulating layer covering the metal conductor, in which the insulating layer is composed of the flame-retardant resin composition described above.

Further, one or more embodiments of the present invention is a metal cable including an insulating wire including a metal conductor and an insulating layer covering the metal conductor, and a covering layer covering the insulating wire, in which at least one of the insulating layer and the covering layer is composed of the flame-retardant resin composition described above.

Further, one or more embodiments of the present invention is an optical fiber cable including an optical fiber and a covering part covering the optical fiber, in which the covering part includes an insulating body directly covering the optical fiber and the insulating body is composed of the flame-retardant resin composition described above.

One or more embodiments of the present invention is a molded article composed of the flame-retardant resin composition described above.

According to the molded article of one or more embodiments of the present invention, excellent flame retardancy, mechanical properties and weather resistance can be simultaneously satisfied.

Incidentally, in one or more embodiments of the present invention, the density in a case where the high-density polyethylene is composed of a mixture of plural kinds of high-density polyethylenes having different densities refers to a value obtained by summing up the values X calculated by the following formula for the respective high-density polyethylenes.

X=density of high-density polyethylene×content of high-density polyethylene in mixture (unit: mass %)

Further, in one or more embodiments of the present invention, the density in a case where the medium-density polyethylene is composed of a mixture of plural kinds of medium-density polyethylenes having different densities refers to a value obtained by summing up the values Y calculated by the following formula for the respective medium-density polyethylenes.

Y=density of medium-density polyethylene×content of medium-density polyethylene in mixture (unit: mass %)

Further, in one or more embodiments of the present invention, the density in a case where the low-density polyethylene is composed of a mixture of plural kinds of low-density polyethylenes having different densities refers to a value obtained by summing up the values Z calculated by the following formula for the respective low-density polyethylenes.

Z=density of low-density polyethylene×content of low-density polyethylene in mixture (unit: mass %)

One or more embodiments of the present invention provide a flame-retardant resin composition which can simultaneously satisfy excellent flame retardancy, mechanical properties and weather resistance, and an insulating wire, a metal cable, an optical fiber cable and a molded article using the same.

DETAILED DESCRIPTION OF THE EMBODIMENTS

Hereinbelow, one or more embodiments of the present invention will be described in detail by using FIG. 1 and FIG. 2.

[Cable]

Figure 1:
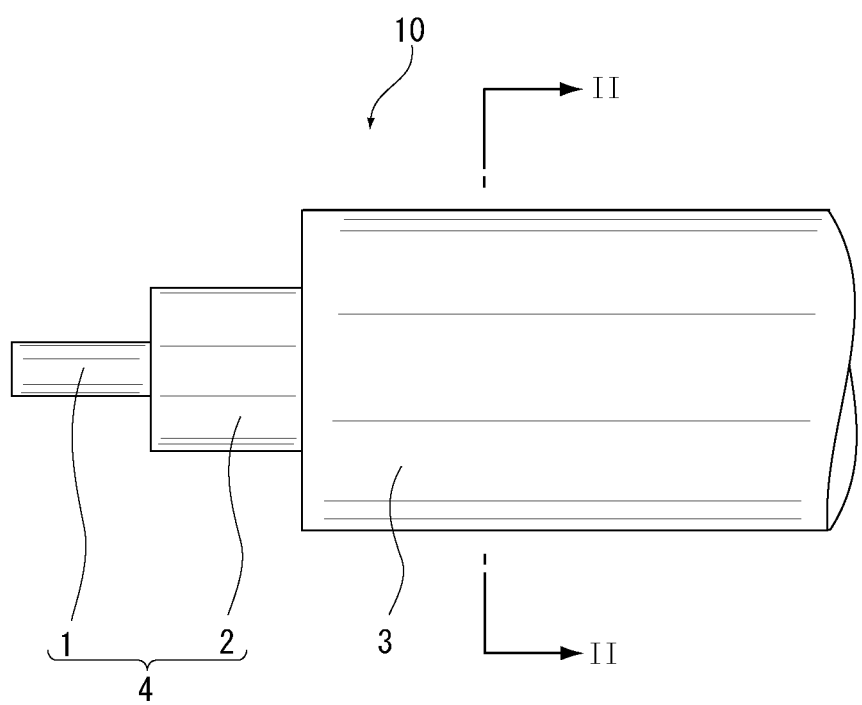
FIG. 1 is a partial side view illustrating a metal cable of one or more embodiments of the present invention.
Figure 2:
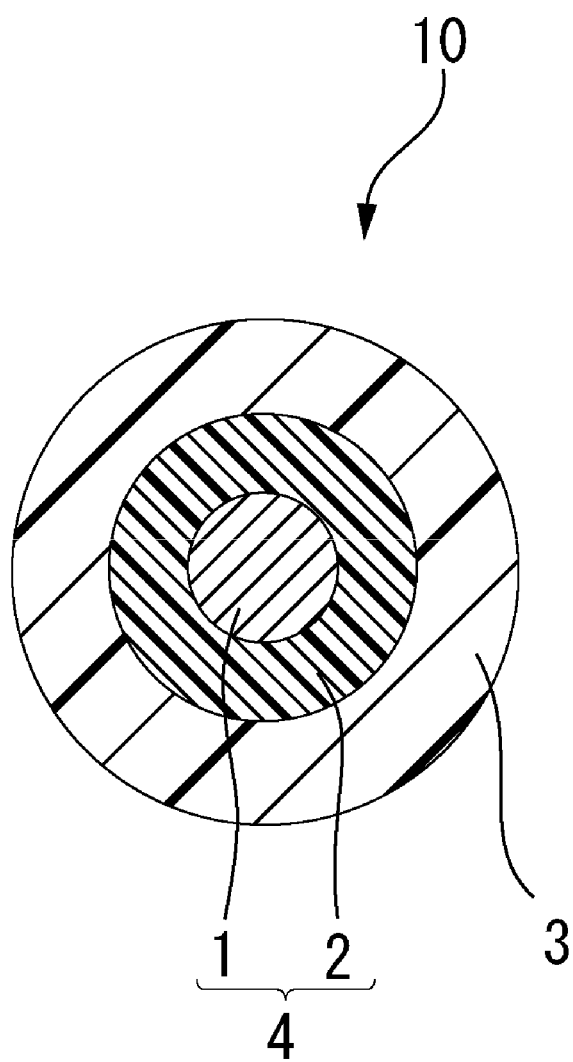
FIG. 2 is a cross-sectional view taken along the line II-II of FIG. 1.

FIG. 1 is a partial side view illustrating a metal cable of one or more embodiments of the present invention. FIG. 2 is a cross-sectional view taken along the line II-II of FIG. 1. As illustrated in FIG. 1 and FIG. 2, a round cable 10 as a metal cable includes an insulating wire 4 and a tubular covering layer 3 covering the insulating wire 4. Moreover, the insulating wire 4 includes an internal conductor 1 as a metal conductor and a tubular insulating layer 2 covering the internal conductor 1.

In one or more embodiments, the tubular insulating layer 2 and the covering layer 3 are composed of the flame-retardant resin composition and this flame-retardant resin composition includes a base resin composed of polyethylene and an acid-modified polyolefin, a silicone compound, a fatty acid-containing compound and a hindered amine-based compound having a hindered amine structure. In this flame-retardant resin composition, the polyethylene is composed of high-density polyethylene, medium-density polyethylene and low-density polyethylene. The density of the high-density polyethylene is 945 kg/m$^3$ or more, the density of the medium-density polyethylene is 914 kg/m$^3$ or more and less than 945 kg/m$^3$, and the density of the low-density polyethylene is 864 kg/m$^3$ or more and less than 914 kg/m$^3$. The content of the high-density polyethylene in the base resin is 40 mass % or more and 60 mass % or less, the content of the medium-density polyethylene in the base resin is 1 mass % or more and 35 mass % or less, the content of the low-density polyethylene in the base resin is 10 mass % or more and 30 mass % or less, the content of the acid-modified polyolefin in the base resin is 1 mass % or more and 20 mass % or less. Further, the silicone compound is blended at a ratio of 3 parts by mass or more and 10 parts by mass or less relative to 100 parts by mass of the base resin, the fatty acid-containing compound is blended at a ratio of 3 parts by mass or more and 10 parts by mass or less relative to 100 parts by mass of the base resin, and the hindered amine-based compound is blended at a ratio of 0.2 part by mass or more and 2.4 parts by mass or less relative to 100 parts by mass of the base resin. The hindered amine-based compound is composed of a first hindered amine-based compound and a second hindered amine-based compound different from the first hindered amine-based compound.

In one or more embodiments, the insulating layer 2 and the covering layer 3 composed of the flame-retardant resin composition described above can simultaneously satisfy excellent flame retardancy, mechanical properties and weather resistance. Accordingly, the round cable 10 can simultaneously satisfy excellent flame retardancy, mechanical properties and weather resistance.

[Method for Manufacturing Cable]

Next, a method of manufacturing the round cable 10 of one or more embodiments will be described.

<Metal Conductor>

First, the internal conductor 1 of one or more embodiments is prepared as a metal conductor. The internal conductor 1 may be composed of only a single wire or be a conductor composed of a bundle of plural single wires. Furthermore, the internal conductor 1 is not particularly limited in terms of conductor diameter or conductor material, and it can be suitably determined depending on use.

<Flame-retardant Resin Composition>

On the other hand, the flame-retardant resin composition of one or more embodiments is prepared. As described above, the flame-retardant resin composition contains the base resin composed of polyethylene and the acid-modified polyolefin resin, the silicone compound, the fatty acid-containing compound and the hindered amine-based compound.

(1) Base Resin

As described above, the base resin of one or more embodiments is composed of polyethylene and the acid-modified polyolefin. In other words, the sum of the content of polyethylene and the content of the acid-modified polyolefin in the base resin is 100 mass %.

Further, as described above, the polyethylene is composed of high-density polyethylene, medium-density polyethylene and low-density polyethylene.

(1-1) High-Density Polyethylene

As described above, in one or more embodiments the density of the high-density polyethylene is 945 kg/m$^3$ or more. The density of the high-density polyethylene is preferably 949 kg/m$^3$ or more. However, the density of the high-density polyethylene is preferably 964 kg/m$^3$ or less. In this case, compared to a case where the density of the high-density polyethylene is more than 964 kg/m$^3$, excellent flame retardancy and excellent mechanical properties are compatible with each other in the flame-retardant resin composition. Further, the density of the high-density polyethylene is preferably 961 kg/m$^3$ or less.

As described above, in one or more embodiments the content of the high-density polyethylene in the base resin is 40 mass % or more and 60 mass % or less. In this case, compared to a case where the content of the high-density polyethylene in the base resin is less than 40 mass %, more excellent mechanical properties can be obtained in the flame-retardant resin composition. Further, the content of the high-density polyethylene in the base resin is more than 60 mass %, more excellent flame retardancy can be obtained in the flame-retardant resin composition. The content of the high-density polyethylene in the base resin is preferably 45 mass % or more and 55 mass % or less. In this case, excellent flame retardancy and excellent mechanical properties are compatible with each other in the flame-retardant resin composition.

(1-2) Medium-Density Polyethylene

As described above, in one or more embodiments the density of the medium-density polyethylene is 914 kg/m$^3$ or more and less than 945 kg/m$^3$. The density of the medium-density polyethylene is preferably 914 kg/m$^3$ or more and 930 kg/m$^3$ or less. In this case, more excellent weather resistance can be obtained in the flame-retardant resin composition.

Further, as described above, in one or more embodiments the content of the medium-density polyethylene in the base resin is 1 mass % or more and 35 mass % or less. In this case, compared to a case where the content of the medium-density polyethylene in the base resin is less than 1 mass %, more excellent flame retardancy can be obtained in the flame-retardant resin composition. Further, compared to a case where the content of the medium-density polyethylene in the base resin is more than 35 mass %, more excellent mechanical properties can be obtained in the flame-retardant resin composition. The content of the medium-density polyethylene in the base resin is preferably 10 mass % or more and 30 mass % or less. In this case, excellent flame retardancy and excellent mechanical properties are compatible with each other in the flame-retardant resin composition.

(1-3) Low-Density Polyethylene

As described above, in one or more embodiments the density of the low-density polyethylene is 864 kg/m$^3$ or more and less than 914 kg/m$^3$. The density of the low-density polyethylene is preferably 880 kg/m$^3$ or more and 910 kg/m$^3$ or less. In this case, excellent weather resistance and excellent mechanical properties are compatible with each other in the flame-retardant resin composition. The density of the low-density polyethylene is more preferably 880 kg/m$^3$ or more and 905 kg/m$^3$ or less. In this case, more excellent weather resistance and more excellent mechanical properties are compatible with each other in the flame-retardant resin composition. The density of the low-density polyethylene is more preferably 895 kg/m$^3$ or more and 905 kg/m$^3$ or less. In this case, even more excellent weather resistance and even more excellent mechanical properties are compatible with each other in the flame-retardant resin composition.

The low-density polyethylene of one or more embodiments may be linear low-density polyethylene, branched low-density polyethylene or a mixture thereof. However, since the molding process is facilitated, the low-density polyethylene preferably contains linear low-density polyethylene.

Further, as described above, in one or more embodiments the content of the low-density polyethylene in the base resin is 10 mass % or more and 30 mass % or less. In this case, compared to a case where the content of the low-density polyethylene in the base resin is less than 10 mass %, more excellent weather resistance can be obtained in the flame-retardant resin composition. Further, compared to a case where the content of the low-density polyethylene in the base resin is more than 30 mass %, more excellent mechanical properties can be obtained in the flame-retardant resin composition. The content of the low-density polyethylene in the base resin is preferably 10 mass % or more and 20 mass % or less. In this case, excellent weather resistance and excellent mechanical properties are compatible with each other in the flame-retardant resin composition.

(1-4) Acid-Modified Polyolefin

In one or more embodiments, the content of the acid-modified polyolefin in the base resin is 1 mass % or more and 20 mass % or less. In this case, compared to a case where the content of the acid-modified polyolefin in the base resin is less than 1 mass %, more excellent flame retardancy can be obtained in the flame-retardant resin composition. Further, compared to a case where the content of the acid-modified polyolefin in the base resin is more than 20 mass %, more excellent mechanical properties can be obtained in the flame-retardant resin composition. The content of the acid-modified polyolefin in the base resin is preferably 1 mass % or more and 15 mass % or less. In this case, compared to a case where the content of the acid-modified polyolefin in the base resin is more than 15 mass %, more excellent wear resistance can be obtained in the flame-retardant resin composition.

In one or more embodiments, the acid-modified polyolefin is the one obtained by modifying polyolefin with an acid or an acid anhydride. Examples of the polyolefin include polyethylene; polypropylene; an ethylene-α-olefin copolymer such as an ethylene-propylene copolymer. Examples of the acid include a carboxylic acid such as acetic acid, acrylic acid and methacrylic acid. Examples of the acid anhydride include a carboxylic acid anhydride such as maleic anhydride. Examples of the acid-modified polyolefin include an ethylene-vinyl acetate copolymer, ethylene-ethyl acrylate copolymer and maleic anhydride-modified polyolefin. Among these, maleic anhydride-modified polyolefin is preferable as the acid-modified polyolefin. In this case, the flame-retardant resin composition has more excellent mechanical properties compared to a case where the acid-modified polyolefin is an acid-modified polyolefin other than the maleic anhydride-modified polyolefin.

(2) Silicone Compound

The silicone compound of one or more embodiments is a compound which functions as a flame retardant aid. Examples of the silicone compound include polyorganosiloxanes. Herein, the polyorganosiloxanes are compounds which have siloxane bonds in the main chain and have organic groups in side chains. Examples of the organic groups include an alkyl group such as a methyl group, an ethyl group or a propyl group; a vinyl group; and an aryl group such as a phenyl group. Specific examples of the polyorganosiloxanes include dimethyl polysiloxane, methylethyl polysiloxane, methyloctyl polysiloxane, methylvinyl polysiloxane, methylphenyl polysiloxane, and methyl-(3,3,3-trifluoropropyl)polysiloxane. The polyorganosiloxane is used in the form of silicone oil, silicone powder, silicone gum or silicone resin. Among them, the polyorganosiloxane is preferably used in the form of silicone gum. In this case, compared to a case where the silicone compound is a silicone compound other than silicone gum, blooming is less likely to occur in the flame-retardant resin composition.

As described above, in one or more embodiments the silicone compound is blended at a ratio of 3 parts by mass or more and 10 parts by mass or less relative to 100 parts by mass of the base resin. In this case, compared to a case where the blending ratio of the silicone compound relative to 100 parts by mass of the base resin is less than 3 parts by mass, more excellent flame retardancy can be obtained in the flame-retardant resin composition. Further, compared to a case where the blending ratio of the silicone compound relative to 100 parts by mass of the base resin is more than 10 parts by mass, the silicone compound is more likely to be evenly mixed in the base resin and partial generation of a lump is less likely to occur. For this reason, bleeding of the silicone compound can be more sufficiently suppressed in the flame-retardant resin composition as well as more excellent weather resistance can be obtained in the flame-retardant resin composition.

In one or more embodiments, the blending ratio of the silicone compound relative to 100 parts by mass of the base resin is preferably 5 parts by mass or more. In this case, compared to a case where the blending ratio of the silicone compound is less than 5 parts by mass, more excellent flame retardancy can be obtained in the flame-retardant resin composition. However, the blending ratio of the silicone compound relative to 100 parts by mass of the base resin is preferably 7 parts by mass or less.

(3) Fatty Acid-Containing Compound

In one or more embodiments, the fatty acid-containing compound functions as a flame retardant aid. The fatty acid-containing compound means a compound containing a fatty acid or a metal salt thereof. Herein, as the fatty acid, a fatty acid having 12 to 28 carbon atoms is used, for example. Examples of such a fatty acid include lauric acid, myristic acid, palmitic acid, stearic acid, tuberculostearic acid, oleic acid, linoleic acid, arachidonic acid, behenic acid, and montanic acid. Among them, stearic acid or tuberculostearic acid is preferable as the fatty acid, and stearic acid is particularly preferable. In this case, more excellent flame retardancy can be obtained compared to a case where a fatty acid other than stearic acid or tuberculostearic acid is used in the flame-retardant resin composition.

The fatty acid-containing compound of one or more embodiments is preferably a fatty acid metal salt. Examples of the metal constituting the fatty acid metal salt include magnesium, calcium, zinc, and lead. As the fatty acid metal salt, magnesium stearate is preferable. In this case, compared to a case where a fatty acid metal salt other than magnesium stearate is used, more excellent flame retardancy can be obtained with a smaller amount of addition in the flame-retardant resin composition.

As described above, in one or more embodiments the fatty acid-containing compound is blended at a ratio of 3 parts by mass or more and 10 parts by mass or less relative to 100 parts by mass of the base resin. In this case, compared to a case where the ratio of the fatty acid-containing compound relative to 100 parts by mass of the base resin is less than 3 parts by mass, more excellent flame retardancy can be obtained in the flame-retardant resin composition. Further, compared to a case where the blending ratio of the fatty acid-containing compound relative to 100 parts by mass of the base resin is more than 10 parts by mass, bleeding of the fatty acid-containing compound can be more sufficiently suppressed as well as more excellent weather resistance can be obtained in the flame-retardant resin composition.

In one or more embodiments, the blending ratio of the fatty acid-containing compound relative to 100 parts by mass of the base resin is preferably 3 parts by mass or more.

In this case, compared to a case where the blending ratio of the fatty acid-containing compound relative to 100 parts by mass of the base resin is less than 3 parts by mass, more excellent flame retardancy can be obtained in the flame-retardant resin composition. However, the blending ratio of the fatty acid-containing compound relative to 100 parts by mass of the base resin is preferably 8 parts by mass or less. In this case, compared to a case where the blending ratio of the fatty acid-containing compound relative to 100 parts by mass of the base resin is more than 8 parts by mass, more excellent weather resistance can be obtained in the flame-retardant resin composition.

(4) Hindered-Amine Compound

In one or more embodiments, the hindered amine-based compound means a compound having a hindered amine structure. Further, as described above, the hindered amine-based compound is composed of a first hindered amine-based compound and a second hindered amine-based compound different from the first hindered amine-based compound.

In one or more embodiments, the hindered amine-based compound is blended at a ratio of 0.2 part by mass to 2.4 parts by mass relative to 100 parts by mass of the base resin as described above. In this case, more excellent flame retardancy, weather resistance and mechanical properties can be obtained in the flame-retardant resin composition.

The hindered amine-based compound is preferably blended at a ratio of 0.6 part by mass or more and 2.0 parts by mass or less relative to 100 parts by mass of the base resin.

(4-1) First Hindered Amine-Based Compound

The first hindered amine-based compound is not particularly limited as long as it is a compound having a hindered amine structure. However, as the first hindered amine-based compound, a nitrogen atom of the hindered amine structure is preferably bonded to an oxygen atom. In this case, more excellent flame retardancy can be obtained in the flame-retardant resin composition. The first hindered amine-based compound in which a nitrogen atom of the hindered amine structure is bonded to an oxygen atom preferably includes a group represented by the following formula (1A). In this case, more excellent flame retardancy can be obtained in the flame-retardant resin composition. Furthermore, the first hindered amine-based compound is more preferably represented by the following formula (2A). In this case, more excellent flame retardancy can be obtained in the flame-retardant resin composition.

[Chem.6]

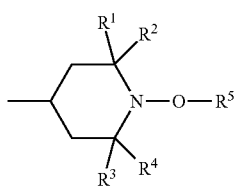

(1A)

(In the formula (1A), $R^1$ to $R^4$ each independently represent an alkyl group having 1 to 8 carbon atoms; $R^5$ represents an alkyl group having 1 to 18 carbon atoms, a cycloalkyl group having 5 to 12 carbon atoms, an aralkyl group having 7 to 25 carbon atoms or an aryl group having 6 to 12 carbon atoms)

[Chem.7]

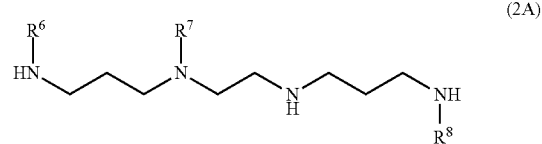

(2A)

(In the formula (2A), $R^6$ to $R^8$ each independently represent a group represented by the following formula (3A))

[Chem.8]

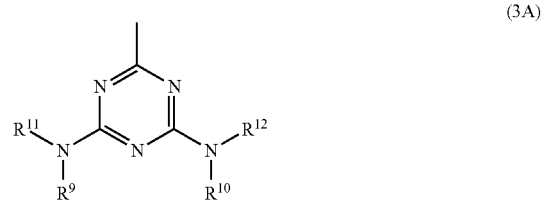

(3A)

(In the formula (3A), $R^9$ and $R^{10}$ each independently represent a group represented by the formula (1A); $R^{11}$ and $R^{12}$ each independently represent an alkyl group having 1 to 18 carbon atoms)

Examples of the first hindered amine-based compound include a compound in which $R^1$ to $R^4$ in the above formula (1A) are methyl groups, $R^5$ is a cyclohexyl group, $R^{11}$ and $R^{12}$ in the formula (3A) are butyl groups, $R^6$ to $R^8$ are identical to each other and $R^9$ and $R^{10}$ are identical to each other, and HOSTAVIN NOW (manufactured by Clariant International Ltd). Among them, as the first hindered amine-based compound, preferable is the compound in which $R^1$ to $R^4$ in the formula (1A) are methyl groups, $R^5$ is a cyclohexyl group, $R^{11}$ and $R^{12}$ in the formula (3A) are butyl groups, $R^6$ to $R^8$ are identical to each other and $R^9$ and $R^{10}$ are identical to each other. In this case, more excellent flame retardancy can be obtained in the flame-retardant resin composition.

In one or more embodiments, the first hindered amine-based compound is preferably blended at a ratio of 0.1 part by mass or more and 1.2 parts by mass or less relative to 100 parts by mass of the base resin. In this case, compared to a case where the blending ratio of the first hindered amine-based compound relative to 100 parts by mass of the base resin is less than 0.1 part by mass, more excellent flame retardancy can be obtained in the flame-retardant resin composition. Further, compared to a case where the blending ratio of the first hindered amine-based compound relative to 100 parts by mass of the base resin is more than 1.2 parts by mass, more excellent mechanical properties can be obtained in the flame-retardant resin composition.

In one or more embodiments, the blending ratio of the first hindered amine-based compound relative to 100 parts by mass of the base resin is preferably 0.2 part by mass or more. In this case, compared to a case where the blending ratio of the first hindered amine-based compound relative to 100 parts by mass of the base resin is less than 0.2 part by mass, more excellent flame retardancy can be obtained in the flame-retardant resin composition. The blending ratio of the first hindered amine-based compound relative to 100 parts of the base resin is preferably 0.5 part by mass or more. In this case, compared to a case where the blending ratio of the first hindered amine-based compound relative to 100 parts by mass of the base resin is less than 0.5 part by mass, more excellent weather resistance can be obtained in the flame-retardant resin composition.

Further, the blending ratio of the first hindered amine-based compound relative to 100 parts by mass of the base resin is more preferably 1.0 part by mass or less. In this case, compared to a case where the blending ratio of the first hindered amine-based compound relative to 100 parts by mass of the base resin is more than 1.0 part by mass, more excellent flame retardancy can be obtained in the flame-retardant resin composition.

(4-2) Second Hindered Amine-Based Compound

The second hindered amine-based compound is not particularly limited as long as it has a hindered amine structure and is a compound different from the first hindered amine-based compound. However, in a case where in the first hindered amine-based compound a nitrogen atom of the hindered amine structure is bonded to an oxygen atom, as the second hindered amine-based compound, a compound in which a nitrogen atom of the hindered amine structure is bonded to a hydrogen atom or a carbon atom is preferable. In this case, more excellent weather resistance can be obtained in the flame-retardant resin composition.

Herein, the second hindered amine-based compound preferably includes a repeating unit represented by the following formula (4A):

[Chem.9]

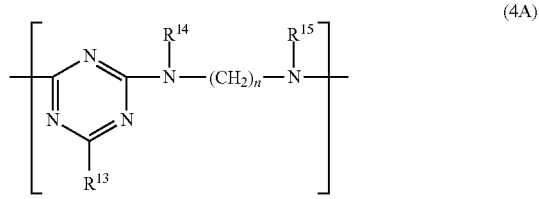

(4A)

(In the above formula (4A), $R^{13}$ represents a group containing a nitrogen atom; $R^{14}$ and $R^{15}$ each independently represent a group represented by the following formula (5A); n represents an integer of 1 to 8)

[Chem.10]

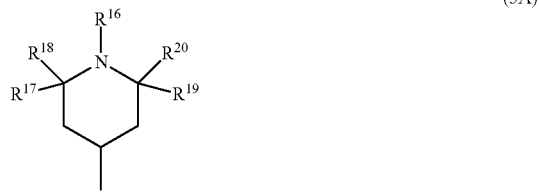

(5A)

(In the formula (5A), $R^{16}$ represents a hydrogen atom, an alkyl group having 1 to 18 carbon atoms, a cycloalkyl group having 5 to 12 carbon atoms, an aralkyl group having 7 to 25 carbon atoms, an aryl group having 6 to 12 carbon atoms; $R^{17}$ to $R^{20}$ each independently represent an alkyl group having 1 to 8 carbon atoms).

The number of the repeating units represented by the above formula (4A) is not particularly limited but is preferably 1 to 6. In this case, more excellent weather resistance can be obtained in the flame-retardant resin composition.

Examples of the second hindered amine-based compound include a compound having 6 repeating units represented by the above formula (4A) in which $R^{16}$ to $R^{20}$ in the formula (5A) are methyl groups, $R^{13}$ in the formula (4A) is a morpholino group, $R^{14}$ and $R^{15}$ are identical to each other and n is 6; sebacic acid bis (1,2,2,6,6-pentamethyl-4-piperidyl); sebacic acid bis (2,2,6,6-tetramethyl-4-piperidyl). Among these, as the second hindered amine-based compound, preferable is the compound having 6 repeating units represented by the above formula (4A) in which $R^{16}$ to $R^{20}$ in the formula (5A) are methyl groups, $R^{13}$ in the formula (4A) is a morpholino group, $R^{14}$ and $R^{15}$ are identical to each other and n is 6. In this case, the deactivation of the second hindered amine-based compound can be more sufficiently suppressed in the flame-retardant resin composition since there is no antagonism with an acid.

In one or more embodiments where the first hindered amine-based compound is blended at a ratio of 0.1 part by mass or more and 1.2 parts by mass or less relative to 100 parts by mass of the base resin, the second hindered amine-based compound is preferably blended at a ratio of 0.1 part by mass or more and 1.2 parts by mass or less relative to 100 parts by mass of the base resin. In this case, occurrence of blooming can be more sufficiently suppressed in the flame-retardant resin composition.

In one or more embodiments, the blending ratio of the second hindered amine-based compound relative to 100 parts by mass of the base resin is preferably 0.3 part by mass or more. In this case, compared to a case where the blending ratio of the second hindered amine-based compound relative to 100 parts by mass of the base resin is less than 0.3 part by mass, more excellent weather resistance can be obtained.

Further, the blending ratio of the second hindered amine-based compound relative to 100 parts by mass of the base resin is preferably 1.0 part by mass or less. In this case, compared to a case where the blending ratio of the second hindered amine-based compound relative to 100 parts by mass of the base resin is more than 1.0 part by mass, occurrence of blooming can be more sufficiently suppressed in the flame-retardant resin composition.

(5) Calcium Carbonate

It is preferable that the flame-retardant resin composition further include calcium carbonate and the calcium carbonate be blended at a ratio of more than 0 part by mass and 60 parts by mass or less relative to 100 parts by mass of the base resin. In this case, compared to a case where the calcium carbonate is not blended, more excellent flame retardancy can be obtained in the flame-retardant resin composition. Further, in this case, compared to a case where the blending ratio of the hindered amine-based flame retardant relative to 100 parts by mass of the base resin is more than 60 parts by mass, more excellent mechanical properties can be obtained in the flame-retardant resin composition.

The blending ratio of calcium carbonate relative to 100 parts by mass of the base resin is preferably 40 parts by mass or less. In this case, compared to a case where the blending ratio of calcium carbonate relative to 100 parts by mass of the base resin is more than 40 parts by mass, more excellent mechanical properties and weather resistance can be obtained in the flame-retardant resin composition. However, the blending ratio of calcium carbonate relative to 100 parts by mass of the base resin is preferably 8 parts by mass or more. In this case, compared to a case where the blending ratio of calcium carbonate relative to 100 parts by mass of the base resin is less than 8 parts by mass, more excellent flame retardancy can be obtained in the flame-retardant resin composition.

In one or more embodiments, the silicone compound and the fatty acid-containing compound may be adhered in advance to the surface of the calcium carbonate. In this case, segregation of the silicone compound and the fatty acid-containing compound is less likely to occur in the flame-retardant resin composition and thus the uniformity of characteristics in the flame-retardant resin composition is further improved.

Examples of the method for adhering the silicone compound and the fatty acid-containing compound to the surface of the calcium carbonate include a method in which the silicone compound and the fatty acid-containing compound are added to the surface of the calcium carbonate and mixed to obtain a mixture, then the mixture is dried at 40 to 75° C. for 10 to 40 minutes, and the dried mixture is pulverized by a Henschel mixer, an atomizer or the like.

The flame-retardant resin composition of one or more embodiments may further include a filler such as an antioxidant, an ultraviolet ray deterioration inhibitor, a processing aid, a coloring pigment or a lubricant.

The flame-retardant resin composition of one or more embodiments can be obtained by kneading the base resin composed of polyethylene and the acid-modified polyolefin, the silicone compound, the fatty acid-containing compound, the hindered amine-based compound and the like. Kneading can be conducted using a kneading machine such as a Banbury mixer, a tumbler, a pressure kneader, a kneading extruder, a twin screw extruder, or a mixing roll. At this time, a master batch (MB) obtained by kneading a part of polyethylene and the silicone compound may be kneaded with the remaining base resin, the fatty acid-containing compound, the hindered amine-based compound and the like from the viewpoint of improving the dispersibility of the silicone compound.

Next, the internal conductor 1 is covered with the flame-retardant resin composition. Specifically, the flame-retardant resin composition is melt-kneaded using an extruding machine to form a tubular extrudate. Then, the tubular extrudate is continuously covered onto the internal conductor 1. Thus, the insulating wire 4 is obtained.

<Covering Layer>

Finally, one insulating wire 4 obtained as described above is prepared, and this insulating wire 4 is covered with the covering layer 3 formed by using the flame-retardant resin composition described above. The covering layer 3 is a so-called sheath, and it protects the insulating layer 2 from physical or chemical damages.

In the manner described above, the round cable 10 is obtained.

[Molded Article]

One or more embodiments of the present invention is a molded article composed of the flame-retardant resin composition described above.

This molded article can simultaneously satisfy excellent flame retardancy, mechanical properties and weather resistance.

The above molded article can be obtained by a general molding method such as an injection molding method or an extrusion molding method.

One or more embodiments of the present invention are not limited to the above embodiments. For example, although the round cable 10 having one insulating wire 4 is used as a metal cable in the above embodiments, the metal cable of one or more embodiments of the present invention is not limited to the round cable, and it may be a cable including two or more insulating wire 4 on the inner side of the covering layer 3. A resin part composed of polypropylene or the like may be provided between the covering layer 3 and the insulating wire 4.

Furthermore, although the insulating layer 2 and the covering layer 3 of the insulating wire 4 is composed of the above-mentioned flame-retardant resin composition in the above embodiments, the insulating layer 2 may be comprised of a typical insulating resin and only the covering layer 3 may be comprised of the above-mentioned flame-retardant resin composition.

Figure 3:
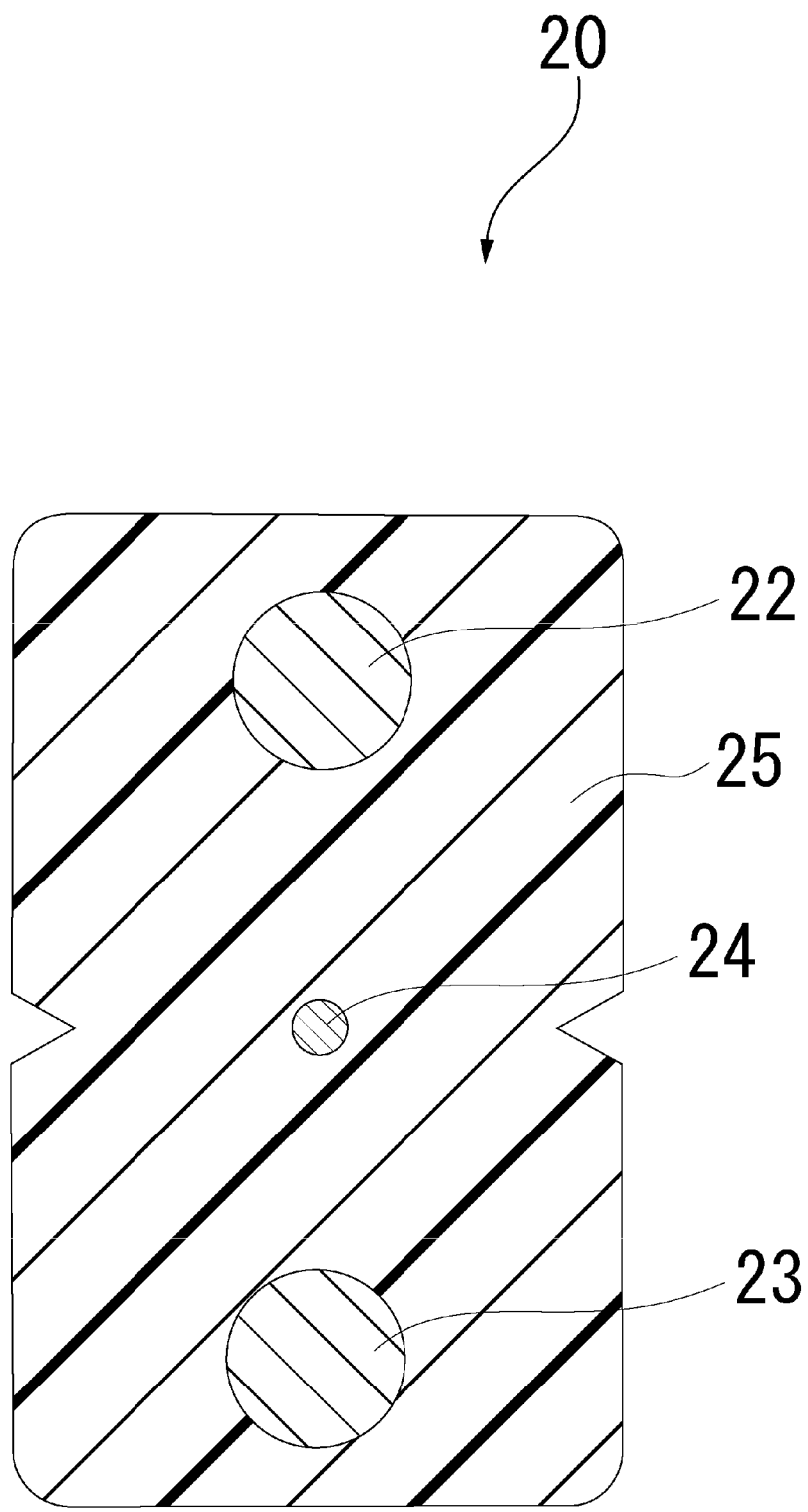
FIG. 3 is a cross-sectional view illustrating an optical fiber cable of one or more embodiments of the present invention.

Furthermore, the flame-retardant resin composition constituting the insulating layer 2 and covering layer 3 of the insulating wire 4 in the above embodiments can also be applied as a covering part or an insulating body of an optical fiber cable including an optical fiber and a covering part containing an insulating body directly covering the optical fiber. For example, FIG. 3 is a cross-sectional view illustrating an indoor type optical fiber cable as the optical fiber cable of one or more embodiments of the present invention. As illustrated in FIG. 3, an indoor type optical fiber cable 20 includes two tension members 22 and 23, an optical fiber 24, and a covering part 25 covering these. Herein, the optical fiber 24 is provided so as to penetrate through the covering part 25. Herein, the covering part 25 is composed of an insulating body directly covering the optical fiber 24 and the insulating body is composed of the flame-retardant resin composition constituting the insulating layer 2 and covering layer 3 of the insulating wire 4 in the above embodiments.

Incidentally, although in the optical fiber cable 20, the covering part 25 is composed of the insulating body, the covering part 25 may further include a covering body covering the insulating body. Herein, the covering body may or may not be composed of the flame-retardant resin composition constituting the insulating layer 2 and covering layer 3 of the insulating wire 4 in the above embodiments. However, the covering body is preferably composed of the flame-retardant resin composition constituting the insulating layer 2 and the covering layer 3 of the insulating wire 4 in the above embodiments.

EXAMPLES

Hereinafter, the contents of one or more embodiments of the present invention will be more specifically described in view of Examples and Comparative Examples. However, the present invention is not limited to the following Examples.

Examples 1 to 22 and Comparative Examples 1 to 17

Polyethylene (hereinafter referred to as the "polyethylene A"), an acid-modified polyolefin, a silicone masterbatch (silicone MB), a fatty acid-containing compound, calcium carbonate, and a hindered amine-based compound were blended in blending amounts shown in Tables 1 to 8 and kneaded at 160° C. for 15 minutes using a Banbury mixer, thereby obtaining flame-retardant resin compositions. Herein, the silicone MB is a mixture of polyethylene (hereinafter referred to as the "polyethylene B") and silicone gum. Incidentally, in Tables 1 to 8, the unit of the blending amount of each blending component is parts by mass. In addition, in Tables 1 to 8, the sum of the blending amount of polyethylene A and the blending amount of the acid-modified polyolefin is not 100 parts by mass, but the polyethylene in the base resin is composed of a mixture of the polyethylene A and the polyethylene B in the silicone MB, and thus the sum of the blending amount of polyethylene A and the blending amount of polyethylene B in the silicone MB becomes 100 parts by mass.

Specifically, as the polyethylene A, the acid-modified polyolefin, the silicone MB, the fatty acid-containing compound, calcium carbonate and the hindered amine-based compound, the following ones were used.

(1) Polyethylene A
(1-1) High-density Polyethylene
HDPE: High-density polyethylene: manufactured by Japan Polyethylene Corporation, density 951 kg/m$^3$
(1-2) Medium-density Polyethylene MDPE: Medium-density polyethylene: manufactured by Sumitomo Chemical Co., Ltd., density 920 kg/m$^3$
(1-3) Low-Density Polyethylene
LDPE 1: Linear low-density polyethylene: manufactured by Sumitomo Chemical Co., Ltd., density 913 kg/m$^3$
LDPE 2: Linear low-density polyethylene: manufactured by Ube-Maruzen Polyethylene Co, Ltd., density 904 kg/m$^3$
LDPE 3: Linear low-density polyethylene (manufactured by Mitsui Chemicals, Inc., density 893 kg/m$^3$
LDPE 4: Linear low-density polyethylene (manufactured by Mitsui Chemicals, Inc., density 864 kg/m$^3$
(2) Acid-Modified Polyolefin
Maleic anhydride-modified polyethylene: manufactured by Mitsui Chemicals, Inc.
(3) Silicone MB
Manufactured by Shin-Etsu Chemical Co., Ltd. (containing silicone gum at 50 mass % and polyethylene B (Medium-density polyethylene: density 915 kg/m$^3$) at 50 mass %)
(4) Calcium Carbonate
Manufactured by Nitto Funka Kogyo K. K. (Average particle size 1.7 μm)
(5) Fatty Acid-Containing Compound
Magnesium stearate: Manufactured by ADEKA Corp.
(6) Hindered Amine-Based Compound
(6-1) First Hindered Amine-Based Compound
A compound represented by the above formula (2A), in which $R^1$ to $R^4$ in the above formula (1A) are methyl groups, $R^5$ is a cyclohexyl group, $R^{11}$ and $R^{12}$ in the above formula (3A) are butyl groups, $R^6$ to $R^8$ are identical to each other and $R^9$ and $R^{10}$ are identical to each other, manufactured by BASF Japan Ltd.
(6-2) Second Hindered Amine-Based Compound
A compound having 6 repeating units represented by the above formula (4A), in which $R^{16}$ to $R^{20}$ in the above formula (5A) are methyl groups, $R^{13}$ in the above formula (4A) is a morpholino group, $R^{14}$ and $R^{15}$ are identical to each other and n is 6, manufactured by Cytec Industries Inc.

[Evaluation on Properties]

For the flame-retardant resin compositions of Examples 1 to 22 and Comparative Examples 1 to 17 obtained as described above, mechanical properties, weather resistance and flame retardancy were evaluated.

Incidentally, the flame retardancy was evaluated for optical fiber cables which were fabricated as follows using the flame-retardant resin compositions of Examples 1 to 22 and Comparative Examples 1 to 17.

(Fabrication of Optical Fiber Cable for Flame Retardancy Evaluation)

The flame-retardant resin compositions of Examples 1 to 22 and Comparative Examples 1 to 17 were charged into a single-screw extruder (25 mm ϕ extruder, manufactured by Marth Seiki CO., LTD.) and kneaded, and tubular extrudates were extruded from the extruder and covered on one coated optical fiber so as to form an ellipse having a cross section with a short diameter of 1.6 mm and a long diameter of 2.0 mm. Thus, optical fiber cables for flame retardancy evaluation were fabricated.

<Mechanical Properties>

Mechanical properties were evaluated for No. 3 dumbbell test pieces which were fabricated based on JIS K6251 using the flame-retardant resin compositions of Examples 1 to 22 and Comparative Examples 1 to 17. Specifically, five of the No. 3 dumbbell test pieces were prepared, a tensile test was conducted according to JIS C3005 for these five No. 3 dumbbell test pieces, and the yield point strength and elongation percentage thus measured were taken as the index for mechanical properties. The results are shown in Tables 1 to 8. Incidentally, in Tables 1 to 8, breaking strength was also shown. Further, the pass criteria for yield point strength and elongation percentage were set as follows. Further, the tensile test was conducted under the conditions of a tensile speed of 200 mm/min and a gauge length of 20 mm.

(Pass Criteria) 10 MPa or more of yield point strength and 600% or more of elongation percentage <Weather Resistance>

Weather resistance was evaluated for No. 3 dumbbell test pieces fabricated using the flame-retardant resin compositions of Examples 1 to 22 and Comparative Examples 1 to 17 in the same manner as the No. 3 dumbbell test pieces used in the evaluation on mechanical properties. Specifically, five of the No. 3 dumbbell test pieces were prepared first, and an accelerated weathering (S-UV) test was conducted for these five No. 3 dumbbell test pieces. At this time, the S-UV test was conducted using a metal halide lamp type weatherometer, and the testing conditions were as follows.

(Testing Conditions)
Black panel temperature: 63° C.
Irradiation intensity: 0.53 kW/h
Irradiation wavelength: 300 to 400 nm
Irradiation time: 150 hours Thereafter, a tensile test was conducted for the five dumbbell test pieces after the S-UV test in the same manner as the tensile test conducted in the evaluation on mechanical properties, and the tensile break strength and tensile elongation were measured. At this time, the average value of tensile break strength and the average value of tensile elongation of the five dumbbell test pieces were taken as values of tensile break strength and tensile elongation, respectively. Subsequently, the ratio (retention) of the tensile break strength after the S-UV test to the tensile break strength before the S-UV test was calculated as the retention of strength. In addition, the ratio (retention) of the tensile elongation after the S-UV test to the tensile elongation before the S-UV test was calculated as the retention of elongation. Moreover, the retention of strength and the retention of elongation were taken as an index of weather resistance. The results are shown in Tables 1 to 8. Incidentally, the pass criteria for weather resistance were set as follows.

(Pass Criteria) 50% or more of retention of strength and 50% or more of retention of elongation <Flame Retardancy>

For ten of the optical fiber cables for flame retardancy evaluation obtained as described above, a 60° inclined combustion test based on JIS C3005 was carried out. Thereafter, the rate of self-extinguished optical fiber cables for flame retardancy evaluation among the ten optical fiber cables for flame retardancy evaluation was calculated as the pass rate (unit: %) based on the following formula, and this pass rate was taken as the evaluation index for flame retardancy. The results are shown in Tables 1 to 8.

Pass rate (%)=100×number of self-extinguished optical fiber cables for flame retardancy evaluation/total number of tested optical fiber cables for flame retardancy evaluation (10)

Incidentally, the pass criteria for flame retardancy were set as follows.

(Pass Criteria) 100% of pass rate

TABLE 1

| | | | | Comparative Example 1 | Comparative Example 2 | Comparative Example 3 | Example 1 | Example 2 | Example 3 |
|---|---|---|---|---|---|---|---|---|---|
| Composition | Polyethylene A | High-density polyethylene | HPPE(density: 951 kg/m$^3$) | 86 | 75 | 75 | 50 | 50 | 50 |
| | | Medium-density polyethylene | MDPE(density: 920 kg/m$^3$) | | | | 25 | 25 | 25 |
| | | Low-density polyethylene | LDPE1(density: 913 kg/m$^3$) | | 11 | | | 11 | |
| | | | LDPE2(density: 904 kg/m$^3$) | | | 11 | 11 | | |
| | | | LDPE3(density: 893 kg/m$^3$) | | | | | | 11 |
| | Acid-modified polyolefin | Maleic anhydride acid-modified polyethylene | | 10 | 10 | 10 | 10 | 10 | 10 |
| | Silicone MB | Polyethylene B (density: 915 kg/m$^3$)/silicone gum | | 4/4 | 4/4 | 4/4 | 4/4 | 4/4 | 4/4 |
| | | Calcium carbonate | | 20 | 20 | 20 | 20 | 20 | 20 |
| | Fatty acid-containing compound | Magnesium stearate | | 5 | 5 | 5 | 5 | 5 | 5 |
| | Hindered amine-based compound | First hindered amine-based compound | | 0.3 | 0.3 | 0.3 | 0.3 | 0.3 | 0.3 |
| | | Second hindered amine-based compound | | 0.8 | 0.8 | 0.8 | 0.8 | 0.8 | 0.8 |
| Properties | Flame retardancy | 60° inclined combustion test | Pass rate (%) | 40 | 80 | 80 | 100 | 100 | 100 |
| | Mechanical properties | Yield point strength (MPa) | | 15.5 | 13.1 | 12.9 | 12.5 | 12.7 | 11.2 |
| | | Breaking strength (MPa) | | 16.3 | 17.8 | 18.0 | 21.4 | 17.6 | 18.3 |
| | | Elongation percentage (%) | | 690 | 686 | 688 | 759 | 627 | 760 |
| | Weather resistance | S-UV test (150 h later) | Retention of strength (%) | 58 | 56 | 57 | 68 | 55 | 57 |
| | | | Retention of elongation (%) | 9 | 13 | 51 | 74 | 53 | 67 |

TABLE 2

| | | | | Example 4 | Comparative Example 4 | Example 5 | Comparative Example 5 | Example 6 | Comparative Example 6 | Comparative Example 7 |
|---|---|---|---|---|---|---|---|---|---|---|
| Composition | Polyethylene A | High-density polyethylene | HPPE(density: 951 kg/m$^3$) | 50 | 40 | 40 | 35 | 55 | 65 | 56 |
| | | Medium-density polyethylene | MDPE(density: 920 kg/m$^3$) | 25 | | 30 | 25 | 1 | 10 | 25 |
| | | Low-density polyethylene | LDPE2(density: 904 kg/m$^3$) | | 46 | 16 | 26 | 30 | 11 | 5 |
| | | | LDPE3(density: 893 kg/m$^3$) | | | | | | | |
| | | | LDPE4(density: 864 kg/m$^3$) | 11 | | | | | | |
| | Acid-modified polyolefin | Maleic anhydride acid-modified polyethylene | | 10 | 10 | 10 | 10 | 10 | 10 | 10 |
| | Silicone MB | Polyethylene B (density: 915 kg/m$^3$)/silicone gum | | 4/4 | 4/4 | 4/4 | 4/4 | 4/4 | 4/4 | 4/4 |
| | | Calcium carbonate | | 20 | 20 | 20 | 20 | 20 | 20 | 20 |
| | Fatty acid-containing compound | Magnesium stearate | | 5 | 5 | 5 | 5 | 5 | 5 | 5 |
| | Hindered amine-based compound | First hindered amine-based compound | | 0.3 | 0.3 | 0.3 | 0.3 | 0.3 | 0.3 | 20 |
| | | Second hindered amine-based compound | | 0.8 | 0.8 | 0.8 | 0.8 | 0.8 | 0.8 | 20 |
| Properties | Flame retardancy | 60° inclined combustion test | Pass rate (%) | 100 | 100 | 100 | 100 | 100 | 80 | 100 |
| | Mechanical properties | Yield point strength (MPa) | | 10.9 | 9.3 | 10.7 | 9.5 | 10.2 | 12.9 | 12.2 |
| | | Breaking strength (MPa) | | 17.6 | 21.2 | 19.1 | 23.4 | 21.6 | 22.4 | 20.5 |
| | | Elongation percentage (%) | | 808 | 830 | 780 | 704 | 847 | 779 | 696 |
| | Weather resistance | S-UV test (150 h later) | Retention of strength (%) | 59 | 85 | 81 | 83 | 86 | 62 | 53 |
| | | | Retention of elongation (%) | 59 | 88 | 86 | 88 | 90 | 55 | 38 |

TABLE 3

| | | | | Comparative Example 8 | Example 7 | Example 1 | Example 8 | Comparative Example 9 |
|---|---|---|---|---|---|---|---|---|
| Composition | Polyethylene A | High-density polyethylene | HPPE(density: 951 kg/m$^3$) | 50 | 50 | 50 | 50 | 50 |
| | | Medium-density polyethylene | MDPE(density: 920 kg/m$^3$) | 35 | 30 | 25 | 15 | 5 |
| | | Low-density polyethylene | LDPE2(density: 904 kg/m$^3$) | 11 | 11 | 11 | 11 | 11 |
| | Acid-modified polyolefin | Maleic anhydride acid-modified polyethylene | | | 5 | 10 | 20 | 30 |
| | Silicone MB | Polyethylene B (density: 915 kg/m$^3$)/silicone gum | | 4/4 | 4/4 | 4/4 | 4/4 | 4/4 |
| | | Calcium carbonate | | 20 | 20 | 20 | 20 | 20 |
| | Fatty acid-containing compound | Magnesium stearate | | 5 | 5 | 5 | 5 | 5 |
| | Hindered amine-based compound | First hindered amine-based compound | | 0.3 | 0.3 | 0.3 | 0.3 | 0.3 |
| | | Second hindered amine-based compound | | 0.8 | 0.8 | 0.8 | 0.8 | 0.8 |
| Properties | Flame retardancy | 60° inclined combustion test | Pass rate (%) | 80 | 100 | 100 | 100 | 100 |
| | Mechanical properties | | Yield point strength (MPa) | 12.8 | 12.6 | 12.5 | 10.4 | 9.8 |
| | | | Breaking strength (MPa) | 19.4 | 20.4 | 21.4 | 20.5 | 21.0 |
| | | | Elongation percentage (%) | 752 | 772 | 759 | 767 | 701 |
| | Weather resistance | S-UV test (150 h later) | Retention of strength (%) | 58 | 57 | 68 | 52 | 56 |
| | | | Retention of elongation (%) | 71 | 70 | 74 | 62 | 60 |

TABLE 4

| | | | | Comparative Example 10 | Comparative Example 11 | Example 9 | Example 1 | Example 10 | Example 11 | Comparative Example 12 |
|---|---|---|---|---|---|---|---|---|---|---|
| Composition | Polyethylene A | High-density polyethylene | HPPE(density: 951 kg/m$^3$) | 50 | 50 | 50 | 50 | 50 | 50 | 50 |
| | | Medium-density polyethylene | MDPE(density: 920 kg/m$^3$) | 25 | 25 | 25 | 25 | 25 | 20 | 14 |
| | | Low-density polyethylene | LDPE2(density: 904 kg/m$^3$) | 15 | 14 | 12 | 11 | 10 | 10 | 11 |
| | Acid-modified polyolefin | Maleic anhydride acid-modified polyethylene | | 10 | 10 | 10 | 10 | 10 | 10 | 10 |
| | Silicone MB | Polyethylene B (density: 915 kg/m$^3$)/silicone gum | | 0/0 | 1/1 | 0/5 | 4/4 | 5/5 | 10/10 | 15/15 |
| | | Calcium carbonate | | 20 | 20 | 20 | 20 | 20 | 20 | 20 |
| | Fatty acid-containing compound | Magnesium stearate | | 5 | 5 | 5 | 5 | 5 | 5 | 5 |
| | Hindered amine-based compound | First hindered amine-based compound | | 0.3 | 0.3 | 0.3 | 0.3 | 0.3 | 0.3 | 0.3 |
| | | Second hindered amine-based compound | | 0.8 | 0.8 | 0.8 | 0.8 | 0.8 | 0.8 | 0.8 |
| Properties | Flame retardancy | 60° inclined combustion test | Pass rate (%) | 0 | 0 | 100 | 100 | 100 | 100 | 100 |
| | Mechanical properties | | Yield point strength (MPa) | 15.5 | 15.1 | 12.8 | 12.5 | 12.4 | 12.0 | 9.6 |
| | | | Breaking strength (MPa) | 16.3 | 16.3 | 20.2 | 21.4 | 17.8 | 17.8 | 13.6 |
| | | | Elongation percentage (%) | 680 | 699 | 747 | 759 | 686 | 702 | 621 |
| | Weather resistance | S-UV test (150 h later) | Retention of strength (%) | 58 | 63 | 70 | 68 | 65 | 63 | 60 |
| | | | Retention of elongation (%) | 9 | 84 | 81 | 74 | 90 | 87 | 88 |

TABLE 5

| | | | | Comparative Example 13 | Example 12 | Example 1 | Example 13 | Comparative Example 14 |
|---|---|---|---|---|---|---|---|---|
| Composition | Polyethylene A | High-density polyethylene | HPPE(density: 951 kg/m$^3$) | 50 | 50 | 50 | 50 | 50 |
| | | Medium-density polyethylene | MDPE(density: 920 kg/m$^3$) | 25 | 25 | 25 | 25 | 25 |
| | | Low-density polyethylene | LDPE2(density: 904 kg/m$^3$) | 11 | 11 | 11 | 11 | 11 |
| | Acid-modified polyolefin | Maleic anhydride acid-modified polyethylene | | 10 | 10 | 10 | 10 | 10 |
| | Silicone MB | Polyethylene B (density: 915 kg/m$^3$)/silicone gum | | 4/4 | 4/4 | 4/4 | 4/4 | 4/4 |
| | | Calcium carbonate | | 20 | 20 | 20 | 20 | 20 |
| | Fatty acid-containing compound | Magnesium stearate | | 2 | 3 | 5 | 10 | 12 |
| | Hindered amine-based compound | First hindered amine-based compound | | 0.3 | 0.3 | 0.3 | 0.3 | 0.3 |
| | | Second hindered amine-based compound | | 0.8 | 0.8 | 0.8 | 0.8 | 0.8 |
| Properties | Flame retardancy | 60° inclined combustion test | Pass rate (%) | 10 | 100 | 100 | 100 | 100 |
| | Mechanical properties | | Yield point strength (MPa) | 12.5 | 12.5 | 12.5 | 11.2 | 10.6 |
| | | | Breaking strength (MPa) | 22.2 | 22.1 | 21.4 | 20.5 | 18.8 |
| | | | Elongation percentage (%) | 783 | 777 | 759 | 767 | 721 |

TABLE 5-continued

|  |  |  | Comparative Example 13 | Example 12 | Example 1 | Example 13 | Comparative Example 14 |
|---|---|---|---|---|---|---|---|
| Weather resistance | S-UV test (150 h later) | Retention of strength (%) | 72 | 72 | 68 | 54 | 52 |
|  |  | Retention of elongation (%) | 79 | 77 | 74 | 51 | 33 |

TABLE 6

|  |  |  |  | Example 14 | Example 1 | Example 15 | Example 16 |
|---|---|---|---|---|---|---|---|
| Composition | Polyethylene A | High-density polyethylene | HPPE(density: 951 kg/m$^3$) | 50 | 50 | 50 | 50 |
|  |  | Medium-density polyethylene | MDPE(density: 920 kg/m$^3$) | 25 | 25 | 25 | 25 |
|  |  | Low-density polyethylene | LDPE2(density: 904 kg/m$^3$) | 11 | 11 | 11 | 11 |
|  | Acid-modified polyolefin | Maleic anhydride acid-modified polyolefin | | 10 | 10 | 10 | 10 |
|  | Silicone MB | Polyethylene B (density: 915 kg/m$^3$)/silicone gum | | 4/4 | 4/4 | 4/4 | 4/4 |
|  |  | Calcium carbonate | |  | 20 | 40 | 60 |
|  | Fatty acid-containing compound | Magnesium stearate | | 5 | 5 | 5 | 5 |
|  | Hindered amine-based compound | First hindered amine-based compound | | 0.3 | 0.3 | 0.3 | 0.3 |
|  |  | Second hindered amine-based compound | | 0.8 | 0.8 | 0.8 | 0.8 |
| Properties | Flame retardancy | 60° inclined combustion test | Pass rate (%) | 100 | 100 | 100 | 100 |
|  | Mechanical properties | Yield point strength (MPa) | | 12.8 | 12.5 | 11.1 | 10.5 |
|  |  | Breaking strength (MPa) | | 25.1 | 21.4 | 18.6 | 15.3 |
|  |  | Elongation percentage (%) | | 800 | 759 | 752 | 705 |
|  | Weather resistance | S-UV test (150 h later) | Retention of strength (%) | 84 | 68 | 68 | 63 |
|  |  |  | Retention of elongation (%) | 91 | 74 | 81 | 58 |

TABLE 7

|  |  |  |  | Comparative Example 15 | Example 17 | Example 1 | Example 18 | Comparative Example 16 |
|---|---|---|---|---|---|---|---|---|
| Composition | Polyethylene A | High-density polyethylene | HPPE(density: 951 kg/m$^3$) | 50 | 50 | 50 | 50 | 50 |
|  |  | Medium-density polyethylene | MDPE(density: 920 kg/m$^3$) | 25 | 25 | 25 | 25 | 25 |
|  |  | Low-density polyethylene | LDPE2(density: 904 kg/m$^3$) | 11 | 11 | 11 | 11 | 11 |
|  | Acid-modified polyolefin | Maleic anhydride acid-modified polyolefin | | 10 | 10 | 10 | 10 | 10 |
|  | Silicone MB | Polyethylene B (density: 915 kg/m$^3$)/silicone gum | | 4/4 | 4/4 | 4/4 | 4/4 | 4/4 |
|  |  | Calcium carbonate | | 20 | 20 | 20 | 20 | 20 |
|  | Fatty acid-containing compound | Magnesium stearate | | 5 | 5 | 5 | 5 | 5 |
|  | Hindered amine-based compound | First hindered amine-based compound | | 0.3 | 0.3 | 0.3 | 0.3 | 1.2 |
|  |  | Second hindered amine-based compound | | 0 | 0.1 | 0.8 | 1.2 | 3.2 |
| Properties | Flame retardancy | 60° inclined combustion test | Pass rate (%) | 100 | 100 | 100 | 100 | 100 |
|  | Mechanical properties | Yield point strength (MPa) | | 12.6 | 11.8 | 12.5 | 12.3 | 9.8 |
|  |  | Breaking strength (MPa) | | 21.8 | 20.7 | 21.4 | 21.2 | 19.3 |
|  |  | Elongation percentage (%) | | 782 | 730 | 759 | 750 | 643 |
|  | Weather resistance | S-UV test (150 h later) | Retention of strength (%) | 40 | 56 | 68 | 92 | 96 |
|  |  |  | Retention of elongation (%) | 6 | 52 | 74 | 90 | 97 |

TABLE 8

|  |  |  |  | Comparative Example 17 | Example 59 | Example 1 | Example 20 | Example 21 | Example 22 |
|---|---|---|---|---|---|---|---|---|---|
| Composition | Polyethylene A | High-density polyethylene | HPPE(density: 951 kg/m$^3$) | 50 | 50 | 50 | 50 | 50 | 50 |
|  |  | Medium-density polyethylene | MDPE(density: 920 kg/m$^3$) | 25 | 25 | 25 | 25 | 25 | 25 |
|  |  | Low-density polyethylene | LDPE2(density: 904 kg/m$^3$) | 11 | 11 | 11 | 11 | 11 | 11 |
|  | Acid-modified polyolefin | Maleic anhydride acid-modified polyolefin | | 10 | 10 | 10 | 10 | 10 | 10 |

TABLE 8-continued

| | | | Comparative Example 17 | Example 59 | Example 1 | Example 20 | Example 21 | Example 22 |
|---|---|---|---|---|---|---|---|---|
| | Silicone MB | Polyethylene B (density: 915 kg/m³)/silicone gum | 4/4 | 4/4 | 4/4 | 4/4 | 4/4 | 4/4 |
| | | Calcium carbonate | 20 | 20 | 20 | 20 | 20 | 20 |
| | Fatty acid-containing compound | Magnesium stearate | 5 | 5 | 5 | 5 | 5 | 5 |
| | Hindered amine-based compound | First hindered amine-based compound | 0 | 0.1 | 0.3 | 0.5 | 0.9 | 1.2 |
| | | Second hindered amine-based compound | 0.8 | 0.8 | 0.8 | 0.8 | 0.8 | 0.8 |
| Properties | Flame retardancy | 60° inclined combustion test  Pass rate (%) | 50 | 100 | 100 | 100 | 100 | 100 |
| | Mechanical properties | Yield point strength (MPa) | 12.6 | 12.5 | 12.5 | 12.3 | 12.4 | 12.5 |
| | | Breaking strength (MPa) | 21.7 | 21.5 | 21.4 | 20.9 | 20.3 | 20.2 |
| | | Elongation percentage (%) | 766 | 752 | 759 | 744 | 738 | 733 |
| | Weather resistance | S-UV test (150 h later)  Retention of strength (%) | 70 | 64 | 68 | 63 | 69 | 72 |
| | | Retention of elongation (%) | 70 | 76 | 74 | 74 | 80 | 79 |

From the results shown in Tables 1 to 8, the flame-retardant resin compositions of Examples 1 to 22 satisfied the pass criteria for mechanical properties, weather resistance and flame retardancy. In contrast, the flame-retardant resin compositions of Comparative Examples 1 to 17 did not satisfy the pass criteria for at least one of mechanical properties, weather resistance and flame retardancy.

From this fact, it was confirmed that the flame-retardant resin composition of one or more embodiments of the present invention can simultaneously satisfy excellent flame retardancy, mechanical properties and weather resistance.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS

1 Internal conductor (metal conductor)
2 Insulating layer
3 Covering layer
4 Insulating wire
10 Round cable (metal cable)
20 Optical fiber cable
24 Optical fiber
25 Covering part (insulating body)

The invention claimed is:

1. A flame-retardant resin composition, comprising:
a base resin composed of polyethylene and an acid-modified polyolefin;
a silicone compound;
a fatty acid-containing compound; and
a hindered amine-based compound including a hindered amine structure;
wherein the polyethylene includes a high-density polyethylene, a medium-density polyethylene and a low-density polyethylene,
wherein the high-density polyethylene has a density of 945 kg/m³ or more,
the medium-density polyethylene has a density of 914 kg/m³ or more and less than 945 kg/m³, and
the low-density polyethylene has a density of 864 kg/m³ or more and less than 914 kg/m³,
wherein the base resin contains the high-density polyethylene in an amount of 40 mass % or more and 60 mass % or less,
the base resin contains the medium-density polyethylene in an amount of 1 mass % or more and 35 mass % or less,
the base resin contains the low-density polyethylene in an amount of 10 mass % or more and 30 mass % or less, and
the base resin contains the acid-modified polyethylene in an amount of 1 mass % or more and 20 mass % or less,
wherein the silicone compound is blended in an amount of 3 parts by mass or more and 10 parts by mass or less relative to 100 parts by mass of the base resin,
the fatty acid-containing compound is blended in an amount of 3 parts by mass or more and 10 parts by mass or less relative to 100 parts by mass of the base resin,
the hindered amine-based compound is blended in an amount of 0.2 part by mass or more and 2.4 parts by mass or less relative to 100 parts by mass of the base resin, and
wherein the hindered amine-based compound is composed of a first hindered amine-based compound and a second hindered amine-based compound different from the first hindered amine-based compound.

2. The flame-retardant resin composition according to claim 1, wherein in the first hindered amine-based compound, a nitrogen atom of the hindered amine structure is bonded to an oxygen atom, and in the second hindered amine-based compound, a nitrogen atom of the hindered amine structure is bonded to a hydrogen atom or a carbon atom.

3. The flame-retardant resin composition according to claim 2, wherein the first hindered amine-based compound includes a group represented by the following formula (1A):

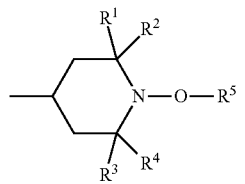
(1A)

where $R^1$ to $R^4$ each independently represent an alkyl group having 1 to 8 carbon atoms; $R^5$ represents an alkyl group having 1 to 18 carbon atoms, a cycloalkyl group having 5 to 12 carbon atoms, an aralkyl group having 7 to 25 carbon atoms, or an aryl group having 6 to 12 carbon atoms.

4. The flame-retardant resin composition according to claim 3, wherein the first hindered amine-based compound is represented by the following formula (2A):

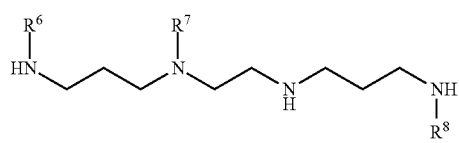
(2A)

where $R^6$ to $R^8$ each independently represent a group represented by the following formula (3A):

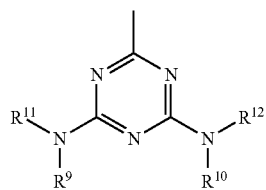
(3A)

where $R^9$ and $R^{10}$ each independently represent a group represented by the formula (1A); and $R^{11}$ and $R^{12}$ each independently represent an alkyl group having 1 to 18 carbon atoms.

5. The flame-retardant resin composition according to claim 4, wherein the second hindered amine-based compound includes a repeating unit represented by the following formula (4A):

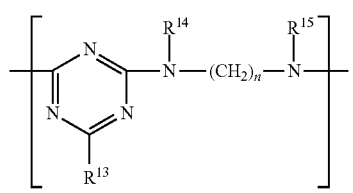
(4A)

where $R^{13}$ represents a group containing a nitrogen atom; $R^{14}$ and $R^{15}$ each independently represent a group represented by the following formula (5A); and n represents an integer of 1 to 8,

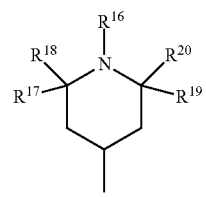
(5A)

where $R^{16}$ represents a hydrogen atom, an alkyl group having 1 to 18 carbon atoms, a cycloalkyl group having 5 to 12 carbon atoms, an aralkyl group having 7 to 25 carbon atoms, or an aryl group having 6 to 12 carbon atoms; and $R^{17}$ to $R^{20}$ each independently represent an alkyl group having 1 to 8 carbon atoms.

6. The flame-retardant resin composition according to claim 1, wherein the first hindered amine-based compound is blended in an amount of 0.1 part by mass or more and 1.2 parts by mass or less relative to 100 parts by mass of the base resin, and
the second hindered amine-based compound is blended in an amount of 0.1 part by mass or more and 1.2 parts by mass or less relative to 100 parts by mass of the base resin.

7. The flame-retardant resin composition according to claim 1, further comprising calcium carbonate,
wherein the calcium carbonate is blended in an amount of more than 0 part by mass and 60 parts by mass or less relative to 100 parts by mass of the base resin.

8. The flame-retardant resin composition according to claim 1, wherein the acid-modified polyolefin is a maleic anhydride-modified polyolefin.

9. The flame-retardant resin composition according to claim 1, wherein the silicone compound is silicone gum.

10. The flame-retardant resin composition according to claim 1, wherein the fatty acid-containing compound is magnesium stearate.

11. An insulating wire, comprising:
a metal conductor; and
an insulating layer that covers the metal conductor,
wherein the insulating layer is composed of the flame-retardant resin composition according to claim 1.

12. A metal cable, comprising:
an insulating wire including a metal conductor and an insulating layer covering the metal conductor; and
a covering layer covering the insulating wire,
wherein at least one of the insulating layer and the covering layer is composed of the flame-retardant resin composition according to claim 1.

13. An optical fiber cable, comprising:
an optical fiber; and
a covering part covering the optical fiber,
wherein the covering part includes an insulating body directly covering the optical fiber cable, and
wherein the insulating body is composed of the flame-retardant resin composition according to claim 1.

14. A molded article, comprising the flame-retardant resin composition according to claim 1.

* * * * *